(12) United States Patent
Gale

(10) Patent No.: US 10,467,392 B2
(45) Date of Patent: Nov. 5, 2019

(54) VERIFYING AND CONTROLLING COMPUTER SYSTEM STATE USING PRONOUNCEABLE RECOGNIZABLE HASH WORDS

(71) Applicant: Microsoft Technology Licensing, LLC, Redmond, WA (US)

(72) Inventor: Edwin J. Gale, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 238 days.

(21) Appl. No.: 15/584,605

(22) Filed: May 2, 2017

(65) Prior Publication Data

US 2018/0322261 A1    Nov. 8, 2018

(51) Int. Cl.
| | |
|---|---|
| *G06F 21/30* | (2013.01) |
| *G06F 9/30* | (2018.01) |
| *G06F 11/36* | (2006.01) |
| *G06F 21/57* | (2013.01) |
| *G09B 5/00* | (2006.01) |
| *G09B 5/06* | (2006.01) |
| *G09B 7/02* | (2006.01) |
| *G09B 19/04* | (2006.01) |
| *G09B 7/00* | (2006.01) |

(52) U.S. Cl.
CPC ........ *G06F 21/305* (2013.01); *G06F 9/30087* (2013.01); *G06F 11/3632* (2013.01); *G06F 21/57* (2013.01); *G09B 5/00* (2013.01); *G09B 5/06* (2013.01); *G09B 7/02* (2013.01); *G09B 19/04* (2013.01); *G06F 2221/0793* (2013.01); *G06F 2221/2141* (2013.01); *G09B 7/00* (2013.01)

(58) Field of Classification Search
CPC combination set(s) only.
See application file for complete search history.

(56) References Cited

U.S. PATENT DOCUMENTS

| | | |
|---|---|---|
| 6,400,293 B1 | 6/2002 | Richardson |
| 6,863,535 B2 | 3/2005 | Krasney |
| 7,036,016 B1 | 4/2006 | Smith |

(Continued)

OTHER PUBLICATIONS

"Compress large Integers into smallest possible string", http://stackoverflow.com/questions/5901153/compress-large-integers-into-smallest-possible-string, last edited Nov. 3, 2016, 4 pages.

*Primary Examiner* — El Hadji M Sall
(74) *Attorney, Agent, or Firm* — Fountainhead Law Group.P.C

(57) ABSTRACT

A target hash phrase can be provided to a user on a computer that indicates a target state of the computer. The computer generates a local hash phrase that represents a current state of the computer. The local hash phrase can be used to verify that the computer is at the target state by comparing the local hash phrase with the target hash phrase. The computer may receive corrective input from the user to correct the state of the computer depending on the comparison. The local hash phrase can be generated by computing one or more hash values from data that represent a state of the computer. The one or more hash values correspond to one or more hash words that comprise the hash phrase. Individual letters of each hash word can be selected using segments of a corresponding hash value.

20 Claims, 6 Drawing Sheets

(56) References Cited

U.S. PATENT DOCUMENTS

| | | | |
|---|---|---|---|
| 8,352,484 B1* | 1/2013 | Schneider | G06F 21/565 |
| | | | 707/758 |
| 8,386,461 B2* | 2/2013 | Bachmann | G06F 21/645 |
| | | | 707/711 |
| 9,342,621 B1* | 5/2016 | Raphel | G06F 16/9014 |
| 2016/0188567 A1* | 6/2016 | Pasternack | G06N 7/005 |
| | | | 704/9 |

* cited by examiner

VERIFYING AND CONTROLLING COMPUTER SYSTEM STATE USING PRONOUNCEABLE RECOGNIZABLE HASH WORDS

BACKGROUND

Collaboration between users often includes verifying that they are in sync with respect to information that is being passed between them. In an online tutorial, for example, an instructor can present illustrative examples that the student is expected to follow along with. It is important to know that both the instructor and the student are looking at the same information. In a technical support situation, where the technical support is being provided remotely, it is important to be able to verify that the user is following instructions given to the user to configure or otherwise affect the user's computer. In situations such as these, verification of the state of the user's computer (e.g., do they have the same lesson plan, have they executed the commands given by tech support) can be performed at certain points in time during the interaction so that corrective action, if any, can be taken before proceeding with the interaction.

The verification effort can be time-consuming. For example, if a lesson plan involves the student following the instructor in a long series of data entries (e.g., running through an example in a spreadsheet application, running through a sequence of menu operations on an application, etc.), the verification process can require both the instructor and the student to review all the data entries, just to determine whether there is an error or not.

SUMMARY

A target hash phrase can be provided to a user on a computer that indicates a target state of the computer. The computer generates a local hash phrase that represents a current state of the computer. The local hash phrase can be used to verify that the computer is at the target state by comparing the local hash phrase with the target hash phrase. The computer may receive corrective input from the user to correct the state of the computer depending on the comparison. The local hash phrase can be generated by computing one or more hash values from data that represent a state of the computer. The one or more hash values correspond to one or more hash words that comprise the hash phrase. Individual letters of each hash word can be selected using segments of a corresponding hash value.

The following detailed description and accompanying drawings provide further understanding of the nature and advantages of the present disclosure.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure can be practiced. Similar or same reference numbers can be used to identify or otherwise refer to similar or same elements in the various drawings and supporting descriptions. In the accompanying drawings.

DETAILED DESCRIPTION

Figure 1:
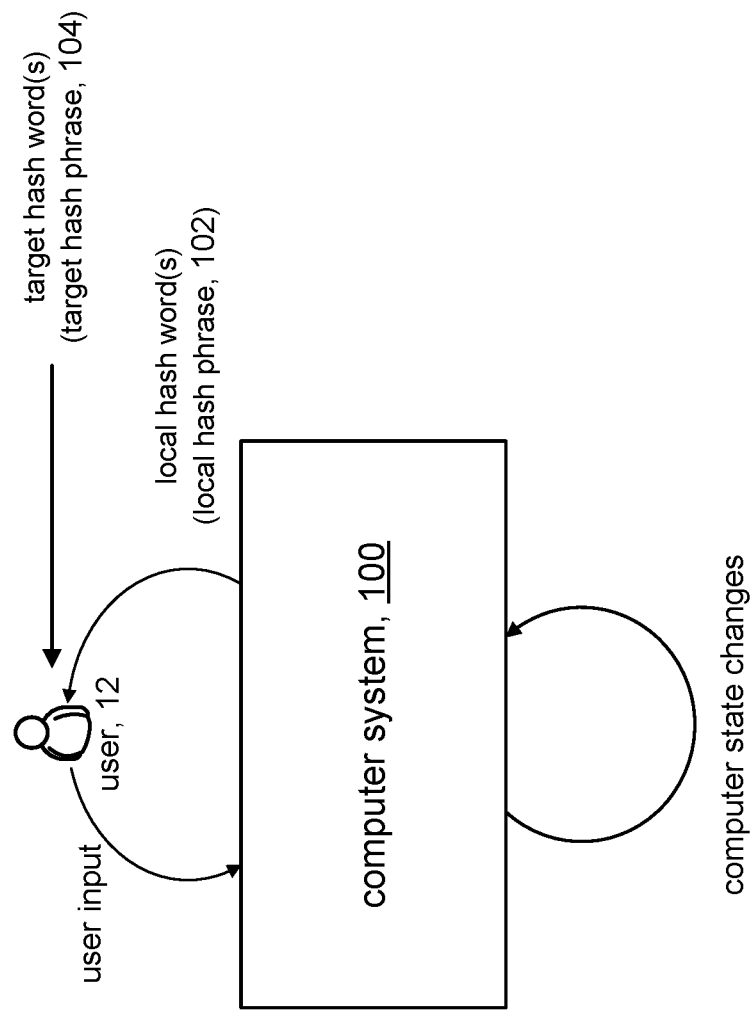
FIG. 1 illustrates a computer system showing the use of hash words and hash phrases in accordance with some embodiments.

In the following description, for purposes of explanation, numerous examples and specific details are set forth in order to provide a thorough understanding of the present disclosure. It will be evident, however, to one skilled in the art that the present disclosure as expressed in the claims can include some or all of the features in these examples, alone or in combination with other features described below, and can further include modifications and equivalents of the features and concepts described herein.

Hash phrases in accordance with the present disclosure can be used to represent computer state. State information of a computer system can be used to generate one or more constituent hash words of the hash phrase. A hash function can be applied to the state information to generate one or more hash codes (hash values). The letters of each hash word can be individually selected from a corresponding hash code.

A hash phrase can represent a current state of the computer system and another hash phrase can represent a desired target state of the computer system. The hash phrases, rather than the system information itself, can be compared to assess whether the state of the computer system is at the desired target state. The computer system can receive user input to correct the computer state, depending on the outcome of the comparison.

A technology-based solution is presented for ensuring that the state of a computer system conforms to a desired target state when a user interacts with the computer system. The solution represents more than the general idea of controlling the state of a computer system because the solution involves a practical implementation for controlling the state of the computer system. The solution provides for comparing computer state that includes a user-friendly and memory-efficient way of conveying a basis for that comparison to a user. The solution includes elements which, alone or in combination, amount to significantly more than simply controlling the state of a computer system.

The present disclosure describes techniques for verifying computer state in a computer system when a user of the computer system collaborates with or otherwise interacts with a user at another computer. The specific information of the computer system that constitutes its computer state generally depends on the nature of the collaboration or interaction. In accordance with the present disclosure, hash phrases comprising one or more letter sequences referred to as hash words can be generated from state information that is representative of the computer state. The state information, which can comprise a significant amount of data, can be hashed using a hash function to produce one or more hash values that in turn can be mapped to one or more hash words, which comprise the hash phrase. In some embodiments, the hash words can be generated on the fly from their respective hash values. A comparison of hash phrases from both computer systems can quickly reveal whether the computer states match.

It can be appreciated that assessing computer state by comparing hash phrases can be far easier for a user than having to read and compare the actual abstract data that comprises the computer state. There is no need for a word dictionary to support the generation of hash words, since the hash words are generated on the fly. This can be significant for mobile devices or other devices where memory is a premium.

FIG. 1 shows a computer system 100 in accordance with the present disclosure. A user 12 can interact with the computer system 100 via suitable input/output devices. The user 12 can provide user input to the computer system 100, and in response the computer system 100 will change its state from a current state to a next state. In accordance with the present disclosure, the computer system 100 can generate a local hash phrase 102 that can be presented to the user 12.

In accordance with the present disclosure, a hash phrase is representative of a state of the computer system 100. What constitutes the "state" of the computer system 100 (computer state) depends heavily on the context in which hash phrases are used, and can refer to any aspect of the computer system 100 such as input data from the user 12, processes executing on the computer system 100, directories in the file system, configuration data, and so on. A hash word can be a monosyllabic human pronounceable letter sequence. In some embodiments, a hash word can be polysyllabic human pronounceable letter sequence. These aspects of the present disclosure are discussed in more detail below.

Continuing with FIG. 1, the local hash phrase 102 is "local" in the sense that it is representative of a current state of computer system 100 (which is local to user 12). A target hash phrase 104 can be provided to the user 12. In some embodiments, the target hash phrase 104 can be representative of a target state of the computer system 100, which in some contexts can be deemed to be a desired state of the computer system 100. The user 12, can use the local hash phrase 102 and the target hash phrase 104 to determine whether computer system 100 is at the desired state. Based on a comparison of the local hash phrase 102 and the target hash phrase 104, the user 12 can operate the computer system 100 to get the computer system 100 into the desired target state. These aspects of the present disclosure are discussed in more detail below.

Figure 2:
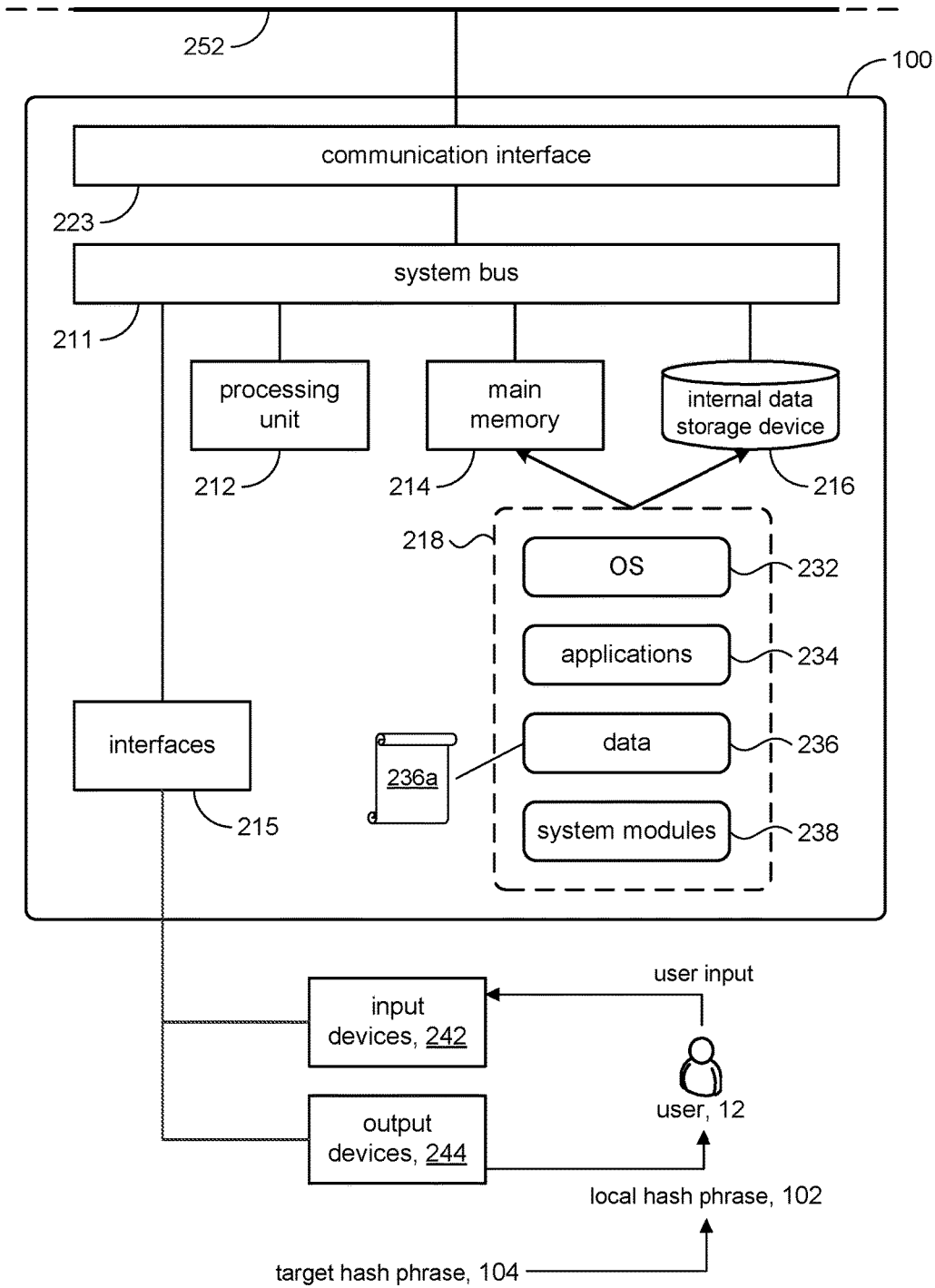
FIG. 2 shows illustrative details of a computer system in accordance with some aspects of some embodiments.

Referring to FIG. 2, the computer system 100 in accordance with some embodiments can comprise a processing unit 212, a system (main) memory 214, and a system bus 211. The system bus 211 can connect various system components including, but not limited to, the processing unit 212, the system memory 214, an internal data storage device 216, and a communication interface 223. In a configuration where the computer system 100 is a mobile device (e.g., smart phone, computer tablet, etc.), the internal data storage 216 may or may not be included.

In some embodiments, the processing unit 212 is a single computing processor configuration. In other embodiments, the processing unit 212 is a multi-processor architecture having multiple computing processing units. The system memory 214 can include read-only memory (ROM) and random access memory (RAM). The internal data storage device 216 can be an internal hard disk drive (HDD), a magnetic floppy disk drive (FDD, e.g., to read from or write to a removable diskette), an optical disk drive (e.g., for reading a CD-ROM disk, or to read from or write to other high capacity optical media such as a DVD), and so on. In a configuration where the computer system 100 is a mobile device, the internal data storage 216 can be a flash memory drive.

The internal data storage device 216 can comprise non-transitory computer-readable storage media to provide non-volatile storage of data, data structures, computer-executable instructions, and so forth. Although the description of computer-readable media above refers to a HDD, a removable magnetic diskette, and a removable optical media such as a CD or DVD, it is noted that other types of media which are readable by a computer, such as zip drives, magnetic cassettes, flash memory cards, cartridges, and the like, can also be used, and further, that any such media can contain computer-executable instructions for performing the methods disclosed herein.

The system memory 214 and/or the internal data storage device 216 can store various program and data modules 218, including for example, operating system 232, one or more application programs 234, program data 236 (e.g., exclusion list 236a, discussed below), and other program/system modules 238. In accordance with the present disclosure, the program and data modules 218 (e.g., application programs 234) can include program code which, when executed by the processing unit 212, can cause the computer system 100 to perform processing in accordance with the present disclosure, e.g., FIGS. 2 and 3 discussed in more detail below.

Access to the computer system 100 can be provided by a suitable input device(s) 242 (e.g., keyboard, mouse, touch screen/pad, voice input device, etc.) and a suitable output device(s) 244, (e.g., display screen, speaker, haptic output, etc.). In a configuration where the computer system 100 is a mobile device, input and output can be provided by a touch sensitive display.

The computer system 100 can operate in a networked environment using logical connections via wired and/or wireless communications to one or more remote computers (not shown) over a communication network 252. The communication network 252 can be a local area network (LAN) and/or larger networks, such as a wide area network (WAN).

Figure 3A:
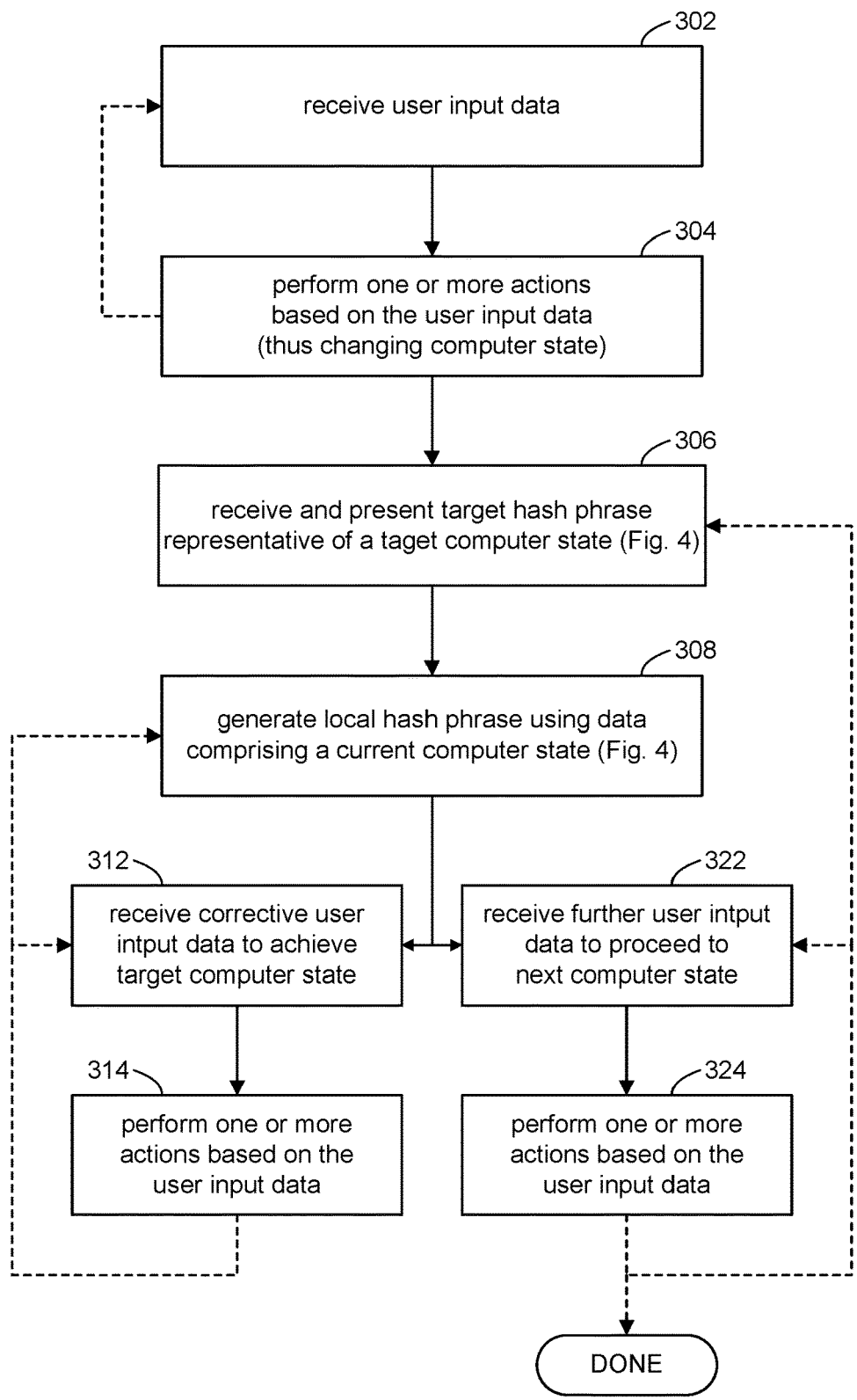
FIGS. 3A and 3B show processing in a computer system for verifying and controlling the state of a computer system using hash words and hash phrases in accordance with some embodiments.

Referring to FIG. 3A, the discussion will now turn to a high level description of processing by computer system 100 in accordance with the present disclosure. In some embodiments, for example, the computer system 100 can include computer executable program code, which when executed by the processing unit 212, can cause the computer system 100 to perform processing in accordance with FIG. 3A. Processing by the computer system 100 is not necessarily limited to the order of the blocks shown in FIG. 3A.

To provide context and illustrative examples in explaining the processing in FIG. 3A, consider the use case of an online tutorial. The user 12 can access the online tutorial on computer system 100, for example, via a web browser. During the course of the tutorial, an instructor can present on their computer system examples for writing computer programs, compiling computer programs and executing the resulting binaries. The user 12 can do the same on their computer system 100 as they follow along.

At block 302, the computer system 100 can receive input data from the user 12. In the online tutorial use case, for example, the input data can be lines of code that the user 12 types in as they follow along with the instructor.

At block 304, the computer system 100 can perform one or more actions based on the user input data. In the online tutorial use case, for example, the computer system 100 can write the input data (e.g., the lines of code entered by the user 12) into a data buffer in main memory. More generally, however, the input data can be any data that is used and manipulated by an application that is executing on the computer system 100, such as a word processing application, a text editor, a spreadsheet application, a graphics application, and so on. In some embodiments, the input data can specify actions to be performed by the computer system 100. For example, the computer system 100 can start and stop processes, affect the file system (e.g., add/delete files or directories, change access rights, etc.), modify configuration data of the computer system 100, and so on.

Figure 3B:
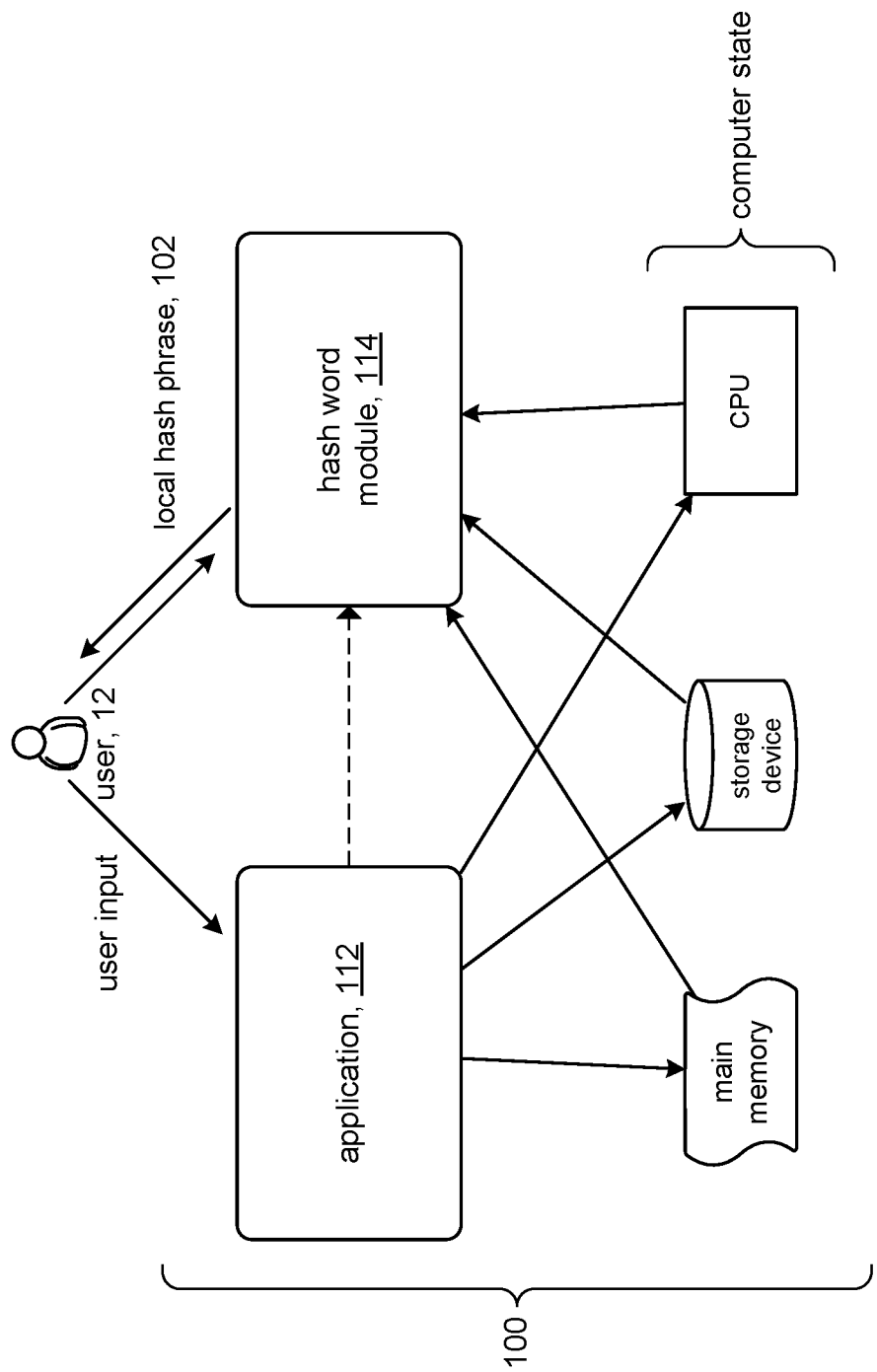

Actions performed by the computer system 100 in response to user input can alter its state. In accordance with the present disclosure, the "state" of the computer system 100 can refer to some aspect of the computer system 100. The specific information about computer system 100 used to define its state depends heavily on the context of a particular use case. Referring for a moment to FIG. 3B, user 12 can interact with computer system 100 via an application 112 executing on the computer system 100. In response to the user's inputs, application 112 can write to main memory, write to the computer system's data storage device (file system, configuration data, etc.), affect processes executing in the CPU of the computer system 100, and so on. In some instance, the state of computer system 100 can be defined by data that is written in the main memory or the storage device. In the online tutorial use case, for example, the state of the computer system 100 can refer to lines of code that have been entered by the user 12. In other embodiments, the state of the computer system 100 can refer to some other aspects of the computer system 100. For example, the state of the computer system 100 can refer to the processes that are executing on the CPU of the computer system 100 (e.g., information about the processes, information associated with the processes, etc.), the files and directories in the file system on the data storage device, configuration data settings of the computer system 100 stored on the storage device, and so on.

Returning to FIG. 3A, processing in the computer system 100 can involve one or more iterations of blocks 302 and 304. Each iteration can change the state of the computer system 100 from its current state to a next state.

At block 306, the computer system 100 can receive a target hash phrase 104 and present that target hash phrase 104 to the user 12. The process of generating the target hash phrase 104 is described in connection with FIG. 4. As mentioned above, the target hash phrase 104 is representative of a target state of the computer system 100. In the online tutorial use case, for example, the target state can be lines of code presented by the instructor. The instructor's lines of code can be considered a "target" state in that user 12 who is participating in the tutorial should have the same lines of code on their computer system 100.

At block 308, the computer system 100 can generate a local hash phrase 102 that is representative of a current state of the computer system 100 at the time of generating the hash phrase. In the online tutorial use case, for example, the current state can be lines of code typed in by the user 12 on computer system 100. In some embodiments, the user 12 can explicitly invoke an action on computer system 100 to generate the local hash phrase 102. Referring to FIG. 3B, in some embodiments, the computer system 100 can include a hash word module 114 to generate one or more hash words comprising the local hash phrase 102. In other embodiments, the computer system 100 can have predetermined criteria for triggering the generation of the local hash phrase 102. The process for generating the local hash phrase 102 is described in connection with FIG. 4.

In the online tutorial use case, if the user 12 wants to verify that the program code they typed in is the same as the instructor's program code, the user 12 can ask the instructor for the target hash phrase 104. The instructor can respond by speaking the target hash phrase 104. For example, the spoken hash phrase may be audibly presented to the user 12 over the computer system's speakers. The user 12 can then verify their program code simply by comparing the local hash phrase 102 that they generated against the target hash phrase 104 that the instructor provided. Using hash phrases can obviate the need for making a visual line by line comparison between the program code, since the hash phrase is representative of the program code. That the hash phrase comprises human pronounceable letter sequences, allows for the hash phrase (e.g., target hash phrase 104) to be spoken in situations where it may not be convenient or possible to display the hash phrase. This also makes hash phrases more easily recognizable and facilitates human comparison of the target hash phrase 104 to the local hash phrase 102.

In the case that the local hash phrase 102 and the target hash phrase 104 do not match, this can mean that the current state of the computer system 100 does not match the target state. In the online tutorial use case, for example, this can mean the user's code does not match up with the code presented in the tutorial, and so the user should take corrective action before continuing with the lesson. Accordingly, processing can continue from block 308 to a corrective loop that begins with block 312.

At block 312, the computer system 100 can receive input data from the user 12 that represents corrective data or corrective actions provided by the user 12 in order to change the computer system 100 from the current state to the target state. In the online tutorial use case, for example, the user 12 can edit the lines of code that they entered.

At block 314, the computer system 100 can perform one or more actions based on the input data provided in block 312. In the online tutorial use case, for example, the computer system 100 can store the input data from block 312 into main memory thus changing its state. The computer system 100 can iterate blocks 312 and 314 one or more times as the user 12 attempts to change the state of the computer system 100, for example, by making further edits to their lines of code. At some point, the user 12 can cause the computer system 100 to generate a new local hash phrase 102 (block 308) and compare it against the target hash phrase 104, to assess their corrective efforts. The computer system 100 can iterate blocks 312, 314, 308 until the target state has been achieved.

Returning to block 308, in the case that there is a match between the local hash phrase 102 and the target hash phrase 104, this can be taken to mean that the current state of the computer system 100 matches the target state. In the online tutorial use case, for example, this can mean the user's code matches up with the code presented in the tutorial, and so the user 12 can continue with their lesson. Processing can then continue to block 322.

At block 322, the computer system 100 can receive further input data from the user 12 to advance the computer system 100 from the current (i.e., target) state to a next state. In the online tutorial use case, for example, the user 12 can continue with the tutorial.

At block 324, the computer system 100 can perform one or more actions based on the input data provided in block 322. The computer system 100 can iterate blocks 322 and 324 one or more times in response to additional input data from the user 12. Processing by the computer system 100 can complete (DONE), for example, when the computer system 100 reaches a termination state. In the online tutorial use case, for example, the termination state may mean the completion of a lesson plan. Alternatively, the computer system 100 can continue processing with block 306 if there is additional processing to be performed by the user 12, which may include additional cycles of verification and correction as described above.

Figure 4:
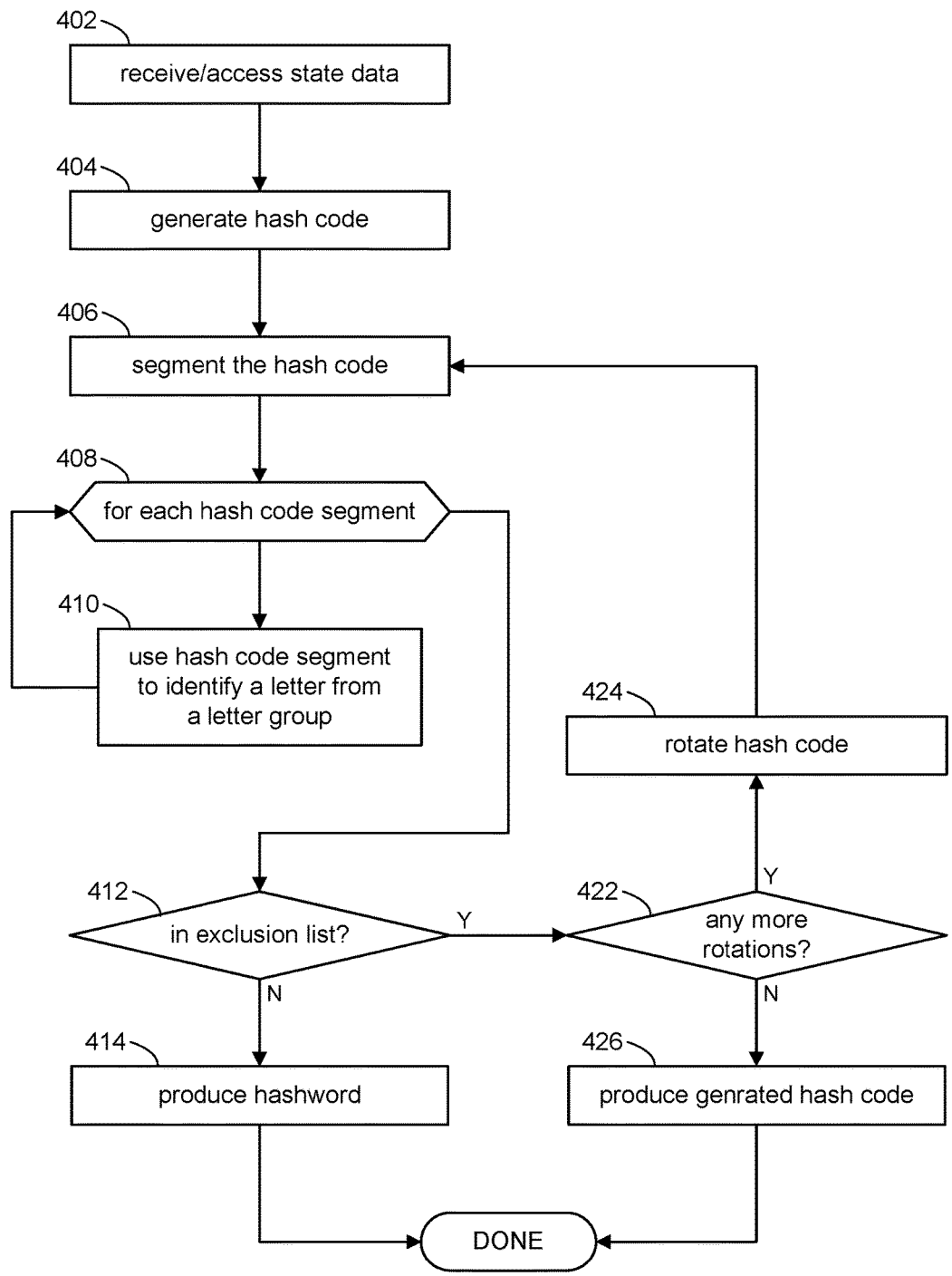
FIG. 4 shows processing in a computer system for generating hash words in accordance with some embodiments.

Referring to FIG. 4, the discussion will now turn to a high level description of processing by computer system 100 to produce hash words in accordance with the present disclosure. The processing shown in FIG. 4 can be performed one or more times to generate one or more hash words comprising a hash phrase. In some embodiments, for example, the computer system 100 can include computer executable program code, which when executed by the processing unit 212, can cause the computer system 100 to perform processing in accordance with FIG. 4. Processing by the computer system 100 is not necessarily limited to the order of the blocks shown in FIG. 4.

At block 402, the computer system 100 can receive or otherwise access state information representative of a state of the computer system 100. For example, this process can be invoked as a function call. An input parameter to the function call can include a pointer to a text buffer comprising the state data. As mentioned above, the state can represent any aspect of computer system 100. In the online tutorial use case, for example, the lines of code entered by the user 12 can constitute a state of the computer system 100. For purposes of explanation, suppose the lines of code entered by the user 12 are:

main( ) {
  printf ("hello world");
}

At block 404, the computer system 100 can apply a hash function to the foregoing text to generate a hash code (hash value). A hash function is a procedure that takes an arbitrary block of data (e.g., the user's lines of code) and returns a fixed-size bit string, referred to as the hash code. Hash functions are characterized in that a small change in the data can completely change the hash code. Thus, for example, the hash of "main( ) {printf ("hello world");}" can yield a particular hash code, while the hash of "main( ) {printf ("hello orld");}" (the 'w' in "world" is missing) can yield a completely different hash code. Different hash functions can generate different size hash codes. For purposes of explanation, we can assume hash codes to be 32-bit values without loss of generality. Suppose for discussion purposes that a hash of the above lines of code yields the 32-bit hash code $98DE34AF_{16}$, expressed as an 8-digit hexadecimal (base 16) numerical value.

At block 406, the computer system 100 can segment the hash code into several segments. In some embodiments, for example, a 32-bit hash code can be segmented into three segments: a 12-bit segment, an 8-bit segment, and another 12-bit segment. It will be appreciated that the number and size of the hash code segments can vary for hash codes of other sizes. Using the example above, the hash code can be segmented into the following hash code segments: segment 1=98D; segment 2=E3; segment 3=4AF.

At block 408, the computer system 100 can process each of the three hash code segments to construct three hash words.

At block 410, for each hash code segment, the computer system 100 can use the hash code segment to identify a letter from a letter group. The computer system 100 can alternate among several letter groups for each hash code segment. In some embodiments, for example, one letter group can comprise all the consonants in the alphabet, namely "bcdfghjklmnpqrstvwxyz," where 'y' is considered to be a consonant instead of a vowel. Another letter group can comprise all the vowels, namely "aeiou." For example, the first hash code segment can be used to select a letter from the consonants letter group, the next hash code segment can be used to select a letter from the vowels letter group, and then back to the consonants letter group, and so on alternating between the consonants and vowels letter groups with each hash code segment.

The hash code segments can be modulo-applied against each letter group. For example, a modulo operation can be performed on each hash code segment using the number of letters in a given letter group as the modulus. The result of the modulo operation can be used to index into the letter group to identify a letter. Continuing with the example above, for example, hash code segment 1 ($98D_{16}$) can be used to identify a letter in the consonants letter group (22 letters in the group) by computing $98D_{16}$ mod $22_{10}=3$, and indexing into the consonants letter group to obtain the consonant 'f'. The same computation can be repeated for hash code segment 2 ($E3_{16}$) with the vowels letter group (5 letters) by computing $E3_{16}$ mod 5=2, and obtaining the vowel 'i'. Hash code segment 3 ($4AF_{16}$) can be used with the consonants letter group to obtain $4AF_{16}$ mod 22=11 and the consonant ' p'. The hash word that results for 32-bit hash code $98DE34AF_{16}$ is "fip".

A hash word generated in this manner, comprising an alternating sequence of consonants and vowels, provides for a readable and pronounceable sequence of letters. In some embodiments, the vowels letter group can be used to select the first letter, followed by a consonant, and then by another vowel. Such letter sequences, however, will yield fewer three-letter combinations, 550 vowel-consonant-vowel combinations as compared to 2420 consonant-vowel-consonant combinations.

In some embodiments, the originally generated hash code (block 404) can be segmented into more than three segments, thus allowing for more letters per hash word. This can be desirable for reducing collisions, and may allow for two-way hash words whereby the originally generated hash code can be recovered from the hash word.

In some embodiments, additional rules for making the hash word can be applied, for example, to improve readability or pronunciation of the hash word. For instance, if the last letter in the hash word is ' q', then a replacement letter (e.g., ' r') can be substituted. If the first letter of the hash word is the letter ' q', then it can be followed by ' u' to improve pronunciation of the resulting hash word, and so on.

At block 412, the computer system 100 can determine whether the generated hash word should not be used. For example, in some embodiments, it can be desirous to exclude hash words that are profane, sound bad, or are otherwise deemed unacceptable. In some embodiments, for example, the generated hash word can be compared against an exclusion list (236a, FIG. 2) of excluded hash words. The computer system 100 can determine that the hash word is in the exclusion list 236a, and proceed to block 422 in response. Conversely, the computer system 100 can determine that the hash word is not in the exclusion list, and proceed to block 414 in response.

At block 414, in response to a determination (block 412) that the generated hash word is not in the exclusion list, the computer system 100 can produce the generated hash word. For example, if a function call was made to invoke the hash word generating process, then the computer system 100 can produce the hash word by writing it to a text buffer.

At block 422, in response to a determination (block 412) that the generated hash word is in the exclusion list, the computer system 100 can alter the hash code. In some embodiments, the computer system 100 can perform a bitwise rotation or a digit-level rotation of the hash code. In the example of 32-bit (8-digit hex) number, a bitwise rotation would allow for 31 retries, while a digit-level rotation allows for 7 retries. The computer system 100 can determine that additional retries are available, and proceed to block 424 in response. Conversely, the computer system 100 can determine that the maximum number of retries has been made with no success at generating an acceptable hash word. In response, computer system 100 can proceed to block 426.

At block 424, the computer system 100 can rotate the hash code to alter the hash code. In some embodiments, for example, the computer system 100 can right-rotate or left-rotate the hash code to produce a rotated hash code. As noted above, the rotation can be bitwise or a digit-level rotation. The computer system 100 can proceed to block 406 to repeat the process with the rotated hash code.

At block 426, in response to a determination (block 422) that the maximum number or retries has been attempted with no success at generating a hash word that is not in the exclusion list 236a, the computer system 100 can simply produce the originally generated hash code (block 404). For example, if a function call was made to invoke the hash word generating process, then the computer system 100 can produce the hash code by writing it to a text buffer.

As noted above, a hash phrase comprising several hash words can be generated by repeating the process shown in FIG. 4. In some instances, for example, if the state information comprises a large size of data, the data can be divided into several blocks of data. Each block of data can be processed per FIG. 4 to generate a corresponding hash word. The several resulting hash words corresponding to the several blocks of data would constitute a hash phrase.

In some embodiments, the target hash phrase 104 can be audibly presented to the user 12. In the online tutorial use case, for example, the instructor can speak the target hash phrase 104 to the user 12. Accordingly, verification of the state of computer system 100 using a visual comparison of the audibly received target hash phrase 104 and the local hash phrase 102 is not possible, since the user 12 had not presented with the letters comprising the target hash phrase 104. In accordance with some embodiments of the present disclosure, the comparison can be performed using a soundex-type of encoding of the local and target hash phrases 102, 104. Using soundex-type encoding, similar sounding words can be encoded to the same representation and be deemed to be a match despite the words being different.

Figure 5:
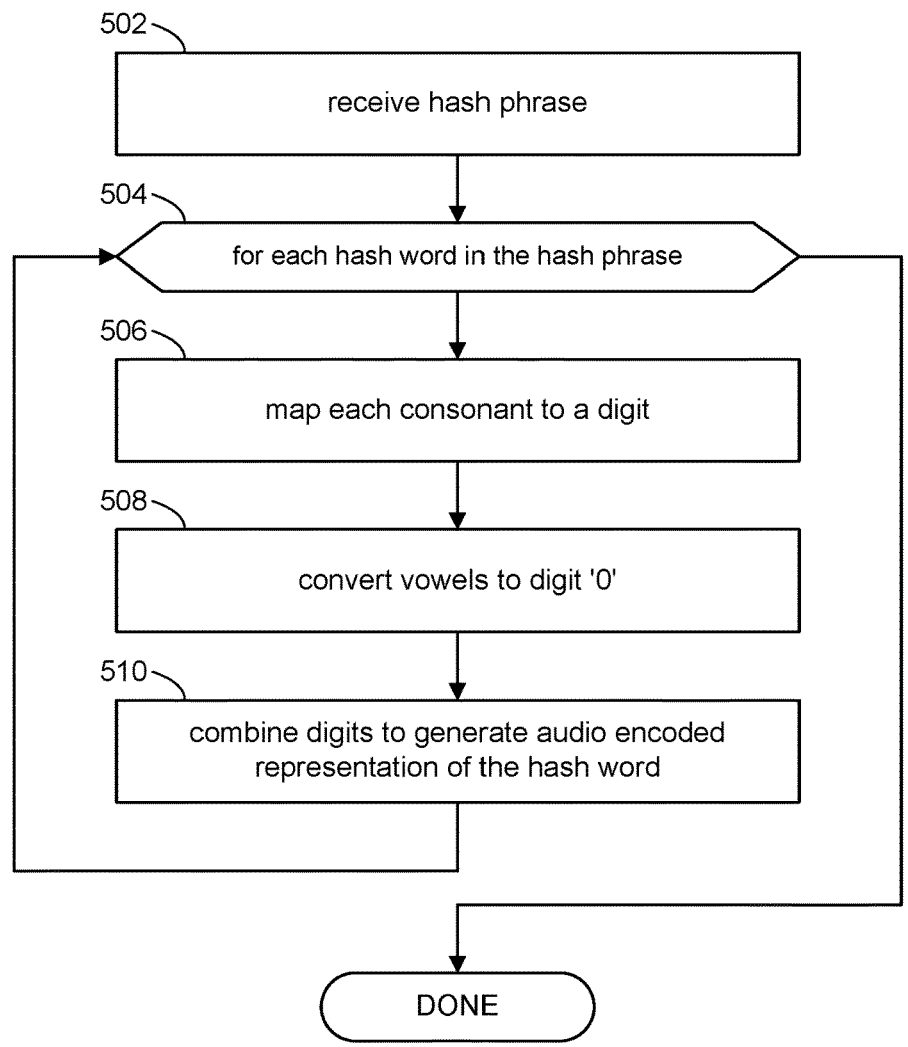
FIG. 5 illustrates processing in a computer system for audibly presented hash phrases in accordance with some embodiments.

Referring to FIG. 5, the discussion will now turn to a high level description of processing by computer system 100 to process hash phrases in a manner suitable for spoken or otherwise audibly presented hash phrases. In some embodiments, for example, the computer system 100 can include computer executable program code, which when executed by the processing unit 212, can cause the computer system 100 to perform processing in accordance with FIG. 5. Processing by the computer system 100 is not necessarily limited to the order of the blocks shown in FIG. 5.

The strategy is to encode the target hash phrase 102 to produce an audio encoded representation of the target hash phrase, likewise to encode the local hash phrase 104 to produce an audio encoded representation of the local hash phrase. The audio encoded versions of the hash phrases can then be compared to verify computer state. For purposes of explaining the process, assume the local hash phrase 102 and the target hash phrase 104 are both "vik naz"; in other words, the computer state (represented by local hash phrase 102) is at the desired target state (represented by target hash phrase 104).

At block 502, the computer system 100 can receive input from a user 12. Suppose, for example, the target hash phrase "vik naz" was spoken to the user 12. Suppose further, that the user 12 can heard the phrase as "big mac" and types "big mac" into the computer system 100.

At block 504, the computer system 100 can process each hash word in the hash phrase.

Figure 6:
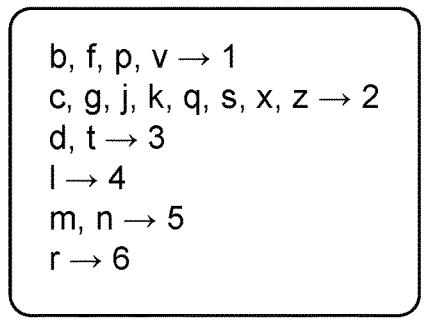
FIG. 6 shows an example of a soundex-based mapping.

At block 506, the computer system 100 can map each consonant in the hash word to a digit. In some embodiments, for example, the encoding shown in FIG. 6 can be used to map each consonant to a digit. Thus, for example, the consonants for hash word "big" would be mapped to 1 and 2.

At block 508, the computer system 100 can map each vowel to digit 0. In other embodiments, the vowels can be passed unencoded.

At block 510, the computer system 100 can combine the digits to produce an audio encoded representation of the hash word. Thus, for example, the hash word "big" can be converted to "102" and the hash word "mac" is converted to "502". In an embodiment where the vowels are ignored, the encoded representations would be "1i2" and "5a2".

The processing shown in FIG. 5 can be repeated again for the local hash phrase 104. Since the local hash phrase 104 is generated locally, it can be visually presented to the user 12. Accordingly, using the example above, the user 12 would input the phrase "vik naz" at block 502 of the process. The computer system 100 would generate the encoded representations "102" for "vik" and "502" for "naz" (assuming vowels are mapped to digit 0), which match the encoded representations for "big mac" which the user 12 heard and entered as the target hash phrase 104. Thus, despite the user 12 mistakenly hearing and entering "big mac" instead of the correct target hash phrase "vik naz", the soundex-type encoding can still provide a reliable match.

Use Cases

The description will now turn to a discussion of use cases to provide further context for the different aspects of the present disclosure.

A. Online Tutorial with Remote Instructor

The online tutorial use case was discussed above. The online tutorial scenario includes a user participating in a tutorial (e.g., introduction to computer programming), for example, via a web browser executing on their computer. The lessons can include an instructor presenting examples of programming code to illustrate various concepts in programming. The user can follow along by typing in the lines of program code on their computer system.

The user's inputs can cause their computer system to store the lines of program code in main memory, compile the lines of program code to produce an executable binary, and so on. Each action the computer system takes can be deemed to change the state of the computer. For example, in the context of this use case, the lines of code typed in by the user can represent computer state that is relevant to the online tutorial. When the user makes changes to their code, that represents a change in the computer state. The executable binary that results from compiling the program code can also constitute a computer state that is relevant to the online tutorial. When a new binary is created, that would represent a change in computer state.

If the user's program code is not working, the user can take corrective action. The user can verify that that the program code they typed in is the same as what was presented in the tutorial, as first step in that corrective action. Expressed in terms of the present disclosure, the user can verify that the their computer state (i.e., entered lines of program code) is the same as the instructor's target computer state (i.e., program code entered by the instructor on their computer system).

As explained above, computer state can be represented using readable, pronounceable hash phrases. In the context of this use case, the hash phrase represents the program code. Each of the computer systems (user's and instructor's) can include a hash word module (e.g., 114, FIG. 3B) that can take the program code and generate a hash phrase comprising one or more hash words per the processing described in connection with FIG. 4. In one instance, the hash word module can generate a single hash word from the program code. In another instance, the hash word module can generate several hash words by partitioning the program code into blocks of text and producing a hash word for each block.

The instructor can generate a hash phrase that represents the program code they have presented in the tutorial. The instructor's hash phrase constitutes a "target hash phrase," since it represents the desired program code. The instructor can speak the target hash phrase to the user, or the target hash phrase can be displayed on the user's computer system. The user can likewise generate a local hash phrase that represents the program code they currently have on their computer system. The user can quickly and reliably verify whether their program code matches the instructor's simply by comparing the target hash phrase with the local hash phrase. By comparison, a visual line-by-line comparison of the program code can be time consuming and error prone, and thus is neither quick not reliable. The use of hash phrases can facilitate the quick verification of computer state (in this case, program code) so that corrective measures can be taken to ensure that the user's computer is in the correct state before continuing with the tutorial.

B. Online Tutorial, Automated

In an automated online tutorial use case, there is no human instructor. Rather, the tutorial can be presented as a web page-based instructional video, allowing for a self-paced approach. The website can allow the user to navigate among the web pages to learn about different programming concepts. Some of the web pages can present illustrative lines of programming code as examples for the user to try. Such a web page can present a target hash phrase along with the lines of programming code, where the hash phrase is computed from and thus represents the presented programming code. When the user has typed the programming code on their computer system, the user can generate a local hash phrase to compare against the target hash phrase to quickly, and with confidence, verify that they have typed in the programming code correctly, before proceeding with the tutorial.

In some embodiments, the web page can include a blank area on the user's computer display to serve as a workspace for the user. For example, the web page can display on one half of the computer display illustrative programming code for the user to try, and the web page can present the workspace on the other half of the computer display. The user can use the workspace to type in the programming code. As the user types into the workspace, the website can generate a hash phrase that is then presented in the workspace to reflect what the user has typed. The user will know they have entered the illustrative programming code correctly when the hash phrase displayed in the workspace matches the hash phrase that is displayed with the illustrative programming code.

C. Remote Technical Support

The remote technical support use case describes a scenario in which a user on their computer is receiving technical support from a support specialist. In this scenario, the support specialist can provide instructions to the user to make changes to the user's computer. Depending on the nature of the technical support, the user's inputs can include commands and data for creating and deleting directories, installing software, stating and stopping processes, making configuration changes, and so on. The relevant computer state(s) in this use case can represent the state of sub-directories in the file system, installed software packages, processes executing on the computer, configuration data, and so on.

The support specialist can want to confirm that the user is following the instructions correctly at certain steps before moving on to the next step. Accordingly, the support specialist can generate a target hash phrase that is representative of computer state that is relevant to the technical support being provided. For example, suppose the support specialist is guiding the user in setting up a certain structure of sub-directories on the file system; that directory structure would represent the relevant computer state. The support specialist can generate a listing of their directory structure. That directory listing can serve as the input data for generating a hash phrase, and in particular that hash phrase can constitute the target hash phrase since the specialist's directory structure constitutes the desired target state. If the user and support specialist are conversing over the telephone instead of interaction online, then the support specialist can speak the target hash phrase to the user.

The user can generate a similar hash phrase (the local hash phrase) using a director listing of the directory structure they set up on their computer system. Verification of whether the user's computer state (i.e., directory structure) matches the target computer state can be quickly made by comparing the local hash phrase and the target hash phrase. Using hash phrases in accordance with the present disclosure avoids the time-consuming and error-prone effort of confirming the directory structure by verbal communication between the support specialist and the user.

This example illustrates the fact that computer state is not necessarily based on data per se (such as user entered data, data in a file, etc.), but rather can be based on information that represent a configuration of the computer, such as in the directory structure example presented above. For example, depending on the context, computer state can represent processes executing on the computer, configuration settings in an application, devices or services installed on the computer, and so on.

The above description illustrates various embodiments of the present disclosure along with examples of how aspects of the particular embodiments can be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents can be employed without departing from the scope of the present disclosure as defined by the claims.

What is claimed is:

1. A computer system comprising:
   at least one computing processor; and
   a computer-readable storage medium having stored thereon computer executable instructions which, when executed by the computing processor, cause the computer system to:
   generate one or more numerical hash values using data representative of a current state of the computer system;
   generate a local hash phrase representative of the current state of the computer system and comprising one or more pronounceable hash words, each hash word generated from a corresponding numerical hash value and comprising only alphabetic characters selected using different segments of the corresponding numerical hash value;
   present the local hash phrase to a user of the computer system, the user receiving a target hash phrase representative of a target state of the computer system; and
   change the state of the computer system using input provided from the user in response to a determination that the local hash phrase does not match the target hash phrase, wherein the input provided from the user causes the current state of the computer system to match the target state of the computer system.

2. The computer system of claim 1, wherein each of the numerical hash values is an N-digit hexadecimal numerical value, wherein execution of the computer executable instructions by the computing processor further causes the computer system to select alphabetic characters that comprise each hash word using subsets of digits that comprise its corresponding N-digit hexadecimal value.

3. The computer system of claim 1, wherein each hash word comprises a consonant followed by a vowel followed by a consonant.

4. The computer system of claim 1, wherein each hash word is monosyllabic.

5. The computer system of claim 1, wherein execution of the computer executable instructions by the computing processor further causes the computer system to generate a replacement hash word to replace a given hash word, in response to the given hash word being listed in an exclusion list.

6. The computer system of claim 1, wherein the target hash phrase is audibly presented to the user.

7. The computer system of claim 1, wherein execution of the computer executable instructions by the computing processor further causes the computer system to present an audible representation of the target hash phrase to the user.

8. The computer system of claim 1, wherein the state of the computer system is represented by information including one or more of:
   data stored in a data storage device of the computer system;
   data stored in a main memory of the computer system;
   data about processes executing on the computer system; and
   data associated with the processes executing on the computer system.

9. A method for controlling a state of a computer system during interactions with a user, the method comprising, by the computer system:
   generating one or more numerical hash values using data representative of a current state of the computer system;
   generating a local hash phrase representative of the current state of the computer system and comprising one or more pronounceable hash words, each hash word generated from a corresponding numerical hash value by segmenting the corresponding numerical hash value into a plurality of segments and using the segments to select corresponding alphabetic characters comprising said each hash word;
   presenting the local hash phrase to a user of the computer system, the user receiving a target hash phrase representative of a target state of the computer system; and
   changing the state of the computer system using input provided from the user in response to a determination that the local hash phrase does not match the target hash phrase, wherein the input provided from the user causes the current state of the computer system to match the target state of the computer system.

10. The method of claim 9, wherein each of the numerical hash values is an N-digit hexadecimal numerical value, the method further comprising selecting alphabetic characters that comprise each hash word using subsets of digits of its corresponding N-digit hexadecimal value.

11. The method of claim 9, wherein each hash word comprises a consonant followed by a vowel followed by a consonant.

12. The method of claim 9, wherein each hash word is monosyllabic.

13. The method of claim 9, further comprising generating a replacement hash word to replace a given hash word, in response to the given hash word being listed in an exclusion list.

14. The method of claim 9, further comprising presenting an audible representation of the target hash phrase to the user.

15. The method of claim 9, wherein the state of the computer system is represented by information including one or more of:
   data stored in a data storage device of the computer system;
   data stored in a main memory of the computer system;
   data about processes executing on the computer system; and
   data associated with the processes executing on the computer system.

16. The method of claim 9, wherein changing the state of the computer system to the target state includes:
   receiving user input from a user; and
   based on data comprising the received user input, performing one or more of:
      storing the data;
      changing a configuration of the computer system; and
      changing a state of execution of the computer system.

17. A non-volatile computer-readable storage medium having stored thereon computer executable instructions which, when executed on a computer system, cause the computer system to:
   generate one or more numerical hash values using data representative of a current state of the computer system;
   generate a local hash phrase representative of the current state of the computer system and comprising one or more pronounceable hash words, each hash word generated from a corresponding numerical hash value and comprising only alphabetic characters selected using different segments of the corresponding numerical hash value;

present the local hash phrase to a user of the computer system, the user receiving a target hash phrase representative of a target state of the computer system; and change the state of the computer system using input provided from the user in response to a determination that the local hash phrase does not match the target hash phrase, wherein the input provided from the user causes the current state of the computer system to match the target state of the computer system.

18. The non-volatile computer-readable storage medium of claim 17, wherein each numerical hash value is an N-digit hexadecimal numerical value, wherein execution of the computer executable instructions by the computer system further causes the computer system to select alphabetic characters that comprise each hash word using subsets of digits of its corresponding N-digit hexadecimal value.

19. The non-volatile computer-readable storage medium of claim 17, wherein each hash word comprises a consonant followed by a vowel followed by a consonant.

20. The non-volatile computer-readable storage medium of claim 17, wherein each hash word is monosyllabic.

* * * * *